United States Patent [19]
Wijas

[11] Patent Number: 5,463,688
[45] Date of Patent: Oct. 31, 1995

[54] TELEPHONE MOUNTING RECEPTACLE HAVING OPPOSED RETRACTABLE LATCH MEMBERS

[75] Inventor: Thomas S. Wijas, Northbrook, Ill.

[73] Assignee: Motorola, Schaumburg, Ill.

[21] Appl. No.: 246,003

[22] Filed: May 19, 1994

[51] Int. Cl.⁶ ..................................... H04M 1/00
[52] U.S. Cl. ........................... 379/446; 379/426; 379/455
[58] Field of Search ................................. 379/446, 449, 379/426, 454, 455, 433; 455/89, 90

[56] References Cited

U.S. PATENT DOCUMENTS

| | | |
|---|---|---|
| 4,723,281 | 2/1988 | Peiker et al.. |
| 4,782,526 | 11/1988 | Uchino et al.. |
| 5,113,436 | 5/1992 | Jarvela et al.. |
| 5,121,863 | 6/1992 | Kotitalo et al. ......................... 379/446 |

FOREIGN PATENT DOCUMENTS

85949  4/1991  Japan ...................................... 379/433

Primary Examiner—Jeffery A. Hofsass
Assistant Examiner—Jack Chiang
Attorney, Agent, or Firm—Daniel W. Juffernbruch

[57] ABSTRACT

A telephone mounting receptacle (100) releasably affixes a portion of a cellular telephone thereto. Two facially opposed simultaneously retractable latch members (130, 140) engage with the portion of a cellular telephone when the retractable latch members (130, 140) are positioned in the latch position. An actuation force applied to either the right force receiving surface (162), or the left force receiving surface (163) of the mounting receptacle (100), simultaneously positions the retractable latch members (130, 140) into a release position. A spring-loaded element (170) applied against the bottom face of the telephone additionally works to "eject" the telephone. At this point, the telephone can be removed from the mounting receptacle (100).

16 Claims, 4 Drawing Sheets

TELEPHONE MOUNTING RECEPTACLE HAVING OPPOSED RETRACTABLE LATCH MEMBERS

BACKGROUND OF THE INVENTION

The present invention relates generally to telephone receptacles and, more particularly, to a telephone mounting receptacle having retractable latch members engaging a portion of a telephone.

Cellular communication systems permit a user to communicate telephonically at virtually any location. Because of this unique convenience, the number of cellular telephone users has increased dramatically in recent years. While many users utilize a mobile cellular telephone that is permanently mounted within an automobile ("mobile"), other users opt for a portable cellular telephone that is not restricted for use within the automobile ("portable"), such as Motorola's DYNA T·A·C™ Cellular Portable Telephone.

While opting for the freedom and versatility of a portable, a user often finds it necessary to utilize such telephones while driving an automobile. Because both eyes and hands must generally be utilized in order to initiate a call, it is advantageous for the driver of an automobile to have a conveniently located mounting receptacle for temporarily supporting the portable. Portable users generally prefer mounting receptacles that can be utilized in conjunction with other "hands free" accessories that effectively allow the portable to function in a manner similar to a conventional telephone speaker phone.

Most of the existing automobile mounting receptacles are designed to accommodate mobile handsets rather than portable units. Many mobile handset mounting receptacles, generally referred to as hang-up cups, are dimensioned to accept the box-like ear piece portion of the handset, which is located at one end of the predominantly longitudinal handset; handsets have a longitudinal dimension that is substantially longer than the transverse dimension that is orthogonal to the longitudinal dimension. The ear piece portion generally contains two molded opposing latching surfaces along the longitudinal axis of the handset that fit corresponding latching members of the hang-up cup. One latching member may be retractable and permit removal of the handset when an actuation force is applied to a side button; however, removal of a handset is generally accomplished by exerting a rotational torque on the handset and pulling it away from the hang-up cup in an up and out fashion; re-attachment of the handset to the hang-up cup is accomplished by reversing the previous movement.

Because the portable does not have a protruding portion with convenient latching surfaces similar to the ear piece portion of the mobile handset, previously known hang-up cups could not readily be utilized to accept the portable. However, because previously known hang-cups generally latch along the longitudinal axis of the ear piece portion, one might try using longitudinal axial latching for portable receptacles. To accomplish longitudinal latching of opposing ends of the portable, the portable receptacle must, unfortunately, be fabricated to extend along the entire longitudinal length of the portable, which in turn requires an automobile mounting surface that corresponds to the lengthy dimensions of the portable.

Because the portable receptacle contacts the entire longitudinal length of the portable, the user may have difficulty when attempting to remove the portable from the portable receptacle. Inability to extend the thumb and forefinger around the perimeter of a portion of the portable while it is retained in the portable receptacle may not only hamper removal of the received portable, but also cause the user to drop the portable during the removal process.

The longitudinal latching must also account for the relatively heavy weight of the portable in reference to that of the mobile handset. Because strong gravitational forces are imparted on both the portable and the receptacle while the automobile is moving, longer latching surfaces extending into corresponding deep molded housing notches of the portable are required to adequately anchor the accepted portable. Unfortunately, deep notches impact the already limited space devoted to the portable's internal electrical components. Also, the longitudinal latching mechanism will have to place additional force on the latch-portable contact points in order to ensure retention of the accepted portable while the automobile is moving. However, the user must then exert additional force when removing the portable from the receptacle or inserting the portable into the receptacle.

DESCRIPTION OF THE PREFERRED EMBODIMENTS

What is needed is a mounting receptacle for a portable cellular telephone compatible with "hands free" accessories that latches across the shorter transverse dimension of the portable with a minimum amount of force, has short latching surfaces that correspond to shallow latching notches in the telephone and accepts only a portion of the telephone so as to facilitate handling by the user during removal of the telephone from the receptacle.

The present invention provides a telephone mounting receptacle for a cellular telephone that accepts a portion of the cellular telephone. The portion of the cellular telephone is retained in the mounting receptacle by facially opposed retractable latch members partially disposed within the telephone receptacle. The retractable latch members are oriented to latch along the transverse dimension of the cellular telephone. When the retractable latch members are positioned in a latch position, the portion of the cellular telephone may be accepted by the mounting receptacle. While accepted, a spring element provides an upward force against the bottom face surface of the cellular telephone promoting attachment between the short latching surfaces of the retractable latch members and shallow latching notches formed in the cellular telephone. Removal of the cellular telephone from the mounting receptacle is accomplished by applying a minimal actuation force to a force receiving surface coupled to the retractable latch members via an intermediate actuator element. The actuation force causes simultaneous movement of retractable latch members to a release position that in turn causes the spring element to force the cellular telephone away from the mounting receptacle.

Figure 1:
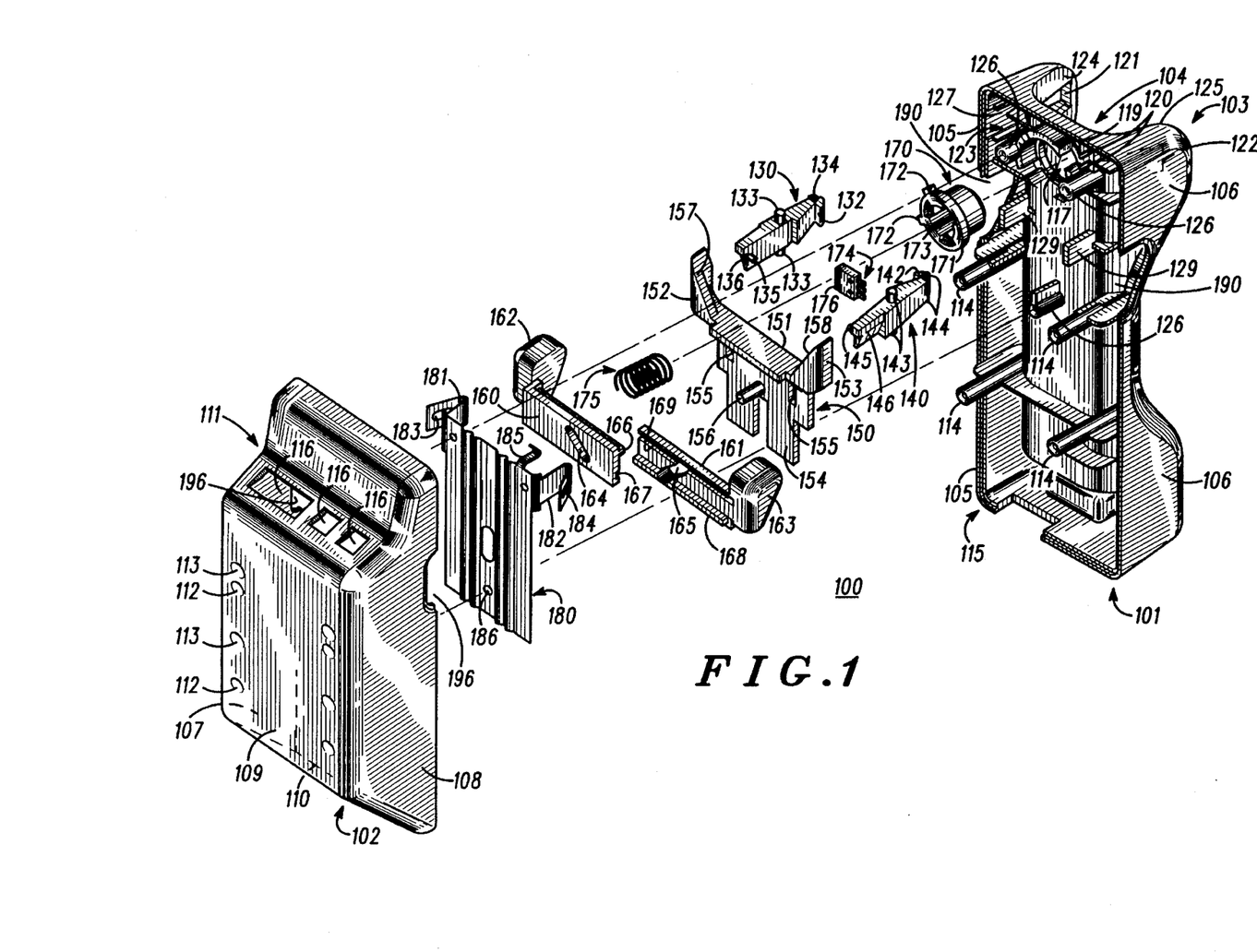
FIG. 1 illustrates an exploded view of the telephone mounting receptacle according to the present invention.

FIG. 1 illustrates an exploded view of a telephone mounting receptacle 100 according to the present invention. The telephone mounting receptacle 100 includes a front housing portion 101 having a contoured front face surface 103 that interconnects a right outer side portion 105 and a left outer side portion 106, each having an opening 190. The front face surface 103 is further defined by a substantially planar recessed area 104 having an opening 117 as well as a right recessed area side portion 124 and a left recessed area side portion 125. The substantially planar recessed area 104 is dimensioned to accept a portion of the cellular telephone. The right recessed area side portion 124 and the left recessed area side portion 125 include respective facially opposed openings 121 and 122. The opening 117 is located between the facially opposed openings 121 and 122. The front housing portion 101 also includes a rear face surface 115 having outward-extending molded protrusions that permit attachment of latch mechanism components and a rear housing portion 102.

The rear housing portion 102 of the telephone mounting receptacle 100 is box-like and includes a planar rear face surface 109. The planar rear face surface 109 includes a plurality of depressions, such as depressions 112, having center bores within extending shaft members which mate with outward extending shaft members 114 of the rear face surface 115 permitting attachment of the front housing portion 101 and the rear housing portion 102. The planar rear face surface 109 further includes a plurality of throughholes, such as throughholes 113, which permit attachment of the telephone mounting receptacle 100 to an automobile mounting location.

The rear housing portion 102 also includes a right side portion 107 and a left side portion 108. The right side portion 107 and the left side portion 108, each containing an opening 196, are formed to interconnect and extend substantially orthogonal to the planar rear face surface 109. The right side portion 107 and the left side portion 108 are further interconnected by a top side portion 111 and a bottom side portion 110. The top side portion 111 extending from the planar rear face surface 109 in a contoured and stepped manner includes openings 116 that permit external cabling for "hands free" circuitry that may reside within the telephone mounting receptacle 100. The bottom side portion 110 extends from the planar rear face surface 109 at an angle and may include slotted openings so as to permit the utilization of a "hands free" speaker mounted inside the telephone mounting receptacle 100.

The telephone mounting receptacle 100 further includes a right retractable latch member 130 and a left retractable latch member 140. The right retractable latch member 130 is inserted via the rear face surface 115 into a cavity 123 formed between an outer sidewall 105 and the right recessed area side portion 124. A front portion of the right retractable latch member 130 comprising a short latching surface 132 resides in the right facially opposed opening 121 upon insertion.

A middle portion of the right retractable latch member 130 comprising a pair of vertical axis tabs 133 extending outward from the top and bottom surface thereof, fit into a pair of corresponding notches 127 of the rear face surface 115 upon insertion. The pair of vertical axis tabs 133 allow pivotal movement about an axis such that movement of a rear portion of the right retractable latch member 130 in one direction causes movement of the front portion of the right retractable latch member 130 in the opposite direction, or vice versa. Thus, movement of the rear portion of the right retractable latch member 130 allows the short latching surface 132 to extend through or retract into the right facially opposed opening 121. However, the short latching surface 132 is prevented from excessively extending through the right facially opposed opening 121 by a plurality of retaining tabs, such as retaining tab 134, extending outward from the top and bottom of the front portion of the right retractable latch member 130.

The rear portion of the right retractable latch member 130 comprises both a projecting nub 135 extending from the left face surface and an angled portion 136 tapering along the bottom right face surface thereof. Upon assembly of the latch mechanism, the angled portion 136 will be further coupled to an intermediate actuator element 150.

The left retractable latch member 140 is preferably an identical mirror image of the right retractable latch member 130 and includes a mirrored short latching surface 142, a mirrored pair of vertical axis tabs 143, a mirrored pair of retaining tabs 144, a mirrored projecting nub 145, and a mirrored angled portion 146 also coupled to the intermediate actuator element 150. Formations integral to the front housing portion 101 permitting accommodation of the right retractable latch member 130 are preferably mirrored to permit similar accommodation of the left retractable latch member 140.

The intermediate actuator element 150 is comprised of a ledge portion 151 residing upon a base portion 154. A right protrusion 152 and left protrusion 153 extend upwardly from the ledge portion 151. The inwardly opposing faces of the right protrusion 152 and left protrusion 153 are defined by a respective right ramped portion 157 and left ramped portion 158, each extending in an angled manner from the top face of the ledge portion 151 to the peak of the respective right protrusion 152 and left protrusion 153. The right ramped portion 157 and the left ramped portion 158 permit complementary slidable engagement with the angled portion 136 of the right retractable latch member 130 and the angled portion 146 of the left retractable latch member 140, respectively.

The base portion 154 of the intermediate actuator element 150 includes rectangularly slotted openings 155 and a projecting tab 156. The slotted openings 155 are of dimensions to permit extension of rectangular tabs 129 extending from the rear face surface 115 of the front housing portion 101 therethrough. The rectangularly slotted openings 155 are vertically elongated to allow the intermediate actuator element 150 to move longitudinally while abutted against the rear face surface 115. The projecting tab 156, formed integral with the intermediate actuator element 150, projects from the rear face surface of the base portion 154.

The telephone mounting receptacle 100 further includes longitudinally extending plate members 160 and 161 having tabular end portions 162 and 163, respectively, forming force receiving surfaces. The plate member 160 includes a slotted opening 164. Similarly, the plate member 161 includes a slotted opening 165. Formed to extend longitudinally along the length of the front surface of the plate member 160 are a rail member 166 and a track member 167. Similarly, but formed to extend longitudinally along the rear surface of the plate member 161, are a rail member 168 and a track member 169.

The plate members 160 and 161 and the rail and the track members 166 and 169 formed on the front and the rear surfaces, respectively, of the respective plate members are of dimensions to permit interfitting engagement therebetween to permit relative sliding movement between the plate members 160 and 161 when positioned in a confronting relationship. Similarly, the track member 167 of the plate member 160 and the rail member 168 of the plate member 161 are of dimensions to permit interfitting engagement such that sliding movement between the plate member 160 and 161 is permitted when positioned in a confronting relationship. The slotted openings 164 and 165 are of dimensions to permit extension of the projecting tab 156 of the intermediate actuator element 150 therethrough.

The telephone mounting receptacle 100 includes an element 170 having a cylindrical body with an enclosed circular front face surface and an outward extending concentric ledge 171 formed about the periphery of an opened rear portion 173. Protruding further from the outward extending concentric ledge 171 are locating tabs 172. The cylindrical element 170 extends through the opening 117 of the substantially planar recessed area 104 via the rear face surface 115. The locating tabs 172, which prevent rotation of the cylindrical element 170, fit into corresponding notched guides 118 contained within the raised wall extending from the rear face surface 115 and encircling the periphery of the opening 117. The cylindrical element 170 moves perpendicularly with respect to the plane formed by the substantially planar recessed area 104 and within the confines of the opening 117 and the raised wall 119. Perpendicular retraction of the cylindrical element 170 into the substantially planar recessed area 104 is further opposed by a spring 175 having a first end disposed behind the front face surface of the cylindrical element 170 via the opened rear portion 173 and a second end retained by a retention panel 180.

An electromechanical switch 174 is mounted about the periphery of the opening 117 on pegs 120 extending from the rear face surface 115 of the front housing portion 101. The electromechanical switch 174 includes a lever arm 176 that extends through an opening in the raised wall 119 and contacts the concentric ledge 171. When no, or insufficient, perpendicular force is applied to the front face surface of the cylindrical element 170, the lever arm 176 remains in contact with the concentric ledge 171 and in a "switched" position. Force applied to the front face surface of the cylindrical element 170 retracts the cylindrical element 170 causing the lever arm 176 to be positioned in an "unswitched" position. Therefore, the electromechanical switch 174 can provide electrical signals capable of discriminating the state of occupancy of the substantially planar recessed area 104 to "hands free" electronic circuitry that could be utilized in conjunction with the telephone mounting receptacle 100.

The retention panel 180 provides seating for the second end of the spring 175 on the front face surface thereof. A plurality of throughholes, such as throughhole 186, permit attachment of the retention panel 180 to threaded shaft members 126 extending from the rear face surface 115 so as to retain the spring 175, the plate members 162 and 163, and the intermediate actuator element 150 in the position thereabove. A curved retaining finger 185 extends outward from the top edge of the retention panel 180 to contact and maintain the position of the electromechanical switch 174 upon the pegs 120. The retention panel 180 is preferably tooled from a sheet of rigid ahoy material, such as beryllium-copper, so as to contain longitudinally extending corrugations that retard transverse bending of the retention panel 180.

The retention panel 180 also includes a right rigidly elastic latch flange 181 and a left rigidly elastic latch flange 182 formed by folding of material at the top right and left edge of the retention panel 180. The right rigidly elastic latch flange 181 material is initially folded into a first portion extending orthogonally from the plane formed by the retention panel 180. Next, a second portion of the right rigidly elastic latch flange 181 material is realized by a second outward reverse fold of the first portion. The resulting right rigidly elastic latch flange 181 is somewhat "V"-shaped. The face of the second portion of the right rigidly elastic latch flange 181 includes a bore 183 extending therethrough. Normal forces applied to the face of the second portion of the right rigidly elastic latch flange 181 are countered by the elastic spring-like aspect inherent at the fold which demarcates the first and second portion of the right rigidly elastic latch flange 181. The left rigidly elastic latch flange 182 having a bore 184 is formed from the left edge material of the retention panel 180 such that the left rigidly elastic latch flange 182 is preferably an identical mirror image of the right rigidly elastic latch flange 181.

With attachment of the retention panel 180 to the rear face surface 115, the right rigidly elastic latch flange 181 extends into the cavity 123 adjacent to the right retractable latch member 130 such that the bore 183 permits the projecting nub 135 of the right retractable latch member 130 to extend therethrough. Likewise, the left rigidly elastic latch flange 182 extends into a similar cavity area such that the bore 184 accommodates the projecting nub 145 of the left retractable latch member 140. The right rigidly elastic latch flange 181 and left rigidly elastic latch flange 182 exert a substantially normal force upon the rear face portions of the respective right retractable latch member 130 and left retractable latch member 140 causing abutment of the right angled portion 136 and the left angled portion 146 against the respective right ramped portion 157 and left ramped portion 158. This causes the right short latching surface 132 and the left short latching surface 142 to protrude through the respective facially opposed openings 121 and 122 and assume a latch position.

Figure 2:
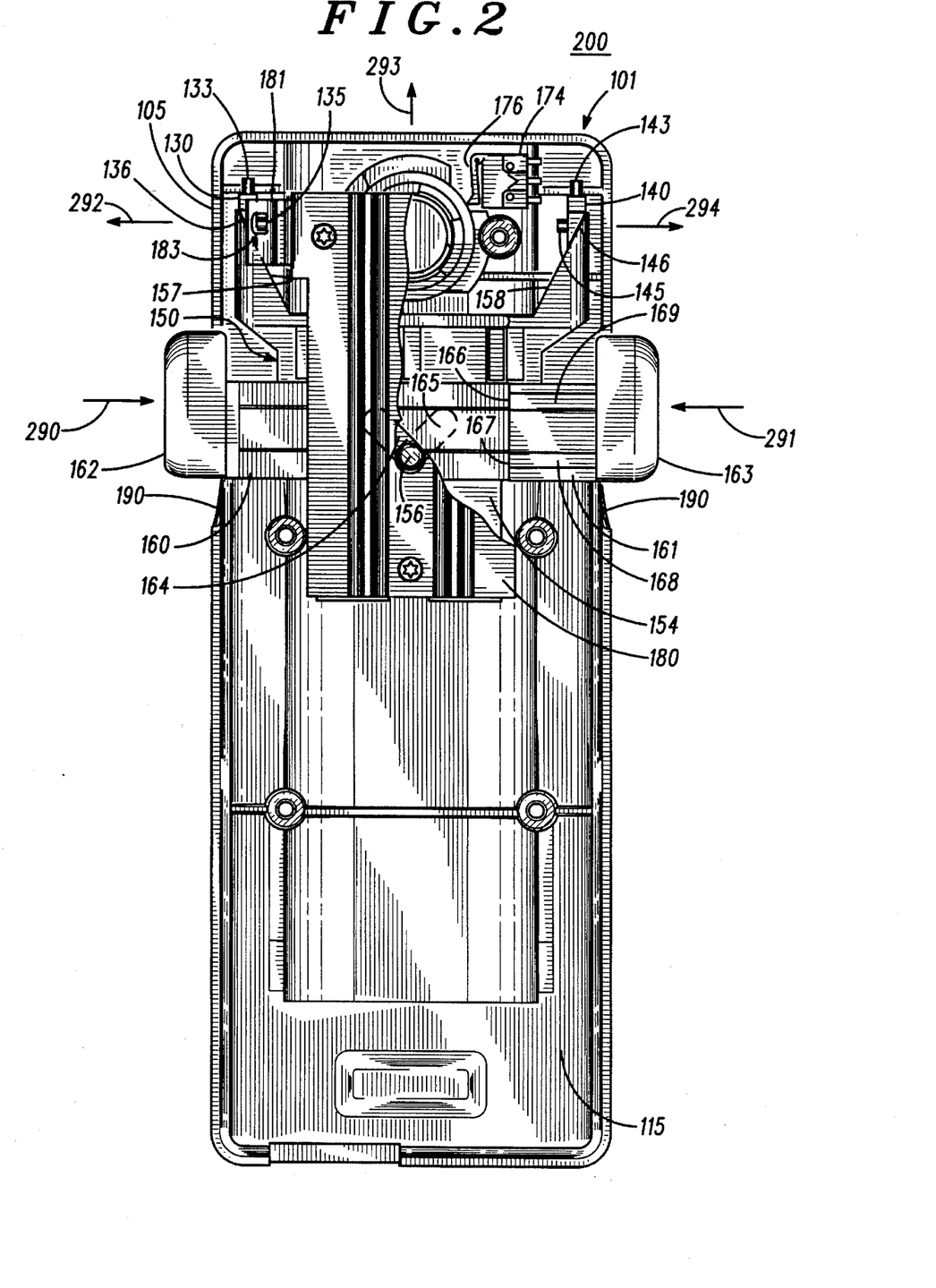
FIG. 2 illustrates an underside view of the from housing portion 101 of the telephone mounting receptacle with the assembled latch mechanism in a latch position according to the present invention.

FIG. 2 illustrates an underside view of the front housing portion 101 of the telephone mounting receptacle 100 with the assembled latch mechanism in a latch position 200 according to the present invention. A portion of the retention panel 180 has been cutaway to better illustrate the interrelationship between the longitudinally extending plate members 160 and 161, the intermediate actuator element 150, the right retractable latch member 130, and the left retractable latch member 140. With the latch mechanism in the latch position 200, the right retractable latch member 130 and the left retractable latch member 140 are in position to accept the portion of the telephone into the telephone mounting receptacle 100.

The longitudinally extending plate members 160 and 161 are aligned with one another such that the rail member 166 of the plate member 160 is positioned in an interfitting relationship with the track member 169 of the plate member 161, and the rail member 168 of the plate member 161 is positioned in an interfitting relationship with the track member 167 of the plate member 160 to permit sliding engagement therebetween. The end portions of plate members 160 and 161 respectively extend through the openings 190 such that the force receiving surfaces 162 and 163 project beyond the surfaces of the respective outer sidewalls 105 and 106. The projecting tab 156 formed to extend from the base portion 154 of the intermediate actuator element 150 extends through the slotted opening 165 of the plate member 161, and the slotted opening 164 of the plate member 160.

An actuation force applied to either the force receiving surface 162 in the direction illustrated by an arrow 290, or upon the force receiving surface 163 in the direction illustrated by an arrow 291 causes translation of the respective plate members 160 and 161. Translation of the plate members 160 and 161, responsive to actuation forces applied to either or both of the force receiving surfaces 162 and 163, exerts forces upon the projecting tab 156 projecting from the base portion 154 of the intermediate actuator element 150. Because the slotted openings 164 and 165 extend at angles relative to the direction of translation permitted of the plate members 160 and 161, a component force transmitted to the projecting tab 156 causes translation of the intermediate actuator element 150 in the direction illustrated by an arrow 293.

As the intermediate actuator element 150 translates in the direction illustrated by the arrow 293, the right angled portion 136 and the left angled portion 146 slidably coupled to the right ramped portion 157 and the left ramped portion 158, move in the direction illustrated by the arrows 290 and 291, respectively. This translation causes compression of the right rigidly elastic latch flange 181 and the left rigidly elastic latch flange 182 coupled to the projecting tabs 135 and 145 of the respective right retractable latch member 130 and left retractable latch member 140. The right retractable latch member 130 and left retractable latch member 140 simultaneously pivot about their respective pair of vertical axis tabs 133 and 143 causing their respective short latching surfaces 132 and 142 to move in the direction illustrated by respective arrows 292 and 294. The translation of the latch mechanism in the aforementioned manner results in a release position as illustrated in FIG. 3.

Figure 3:
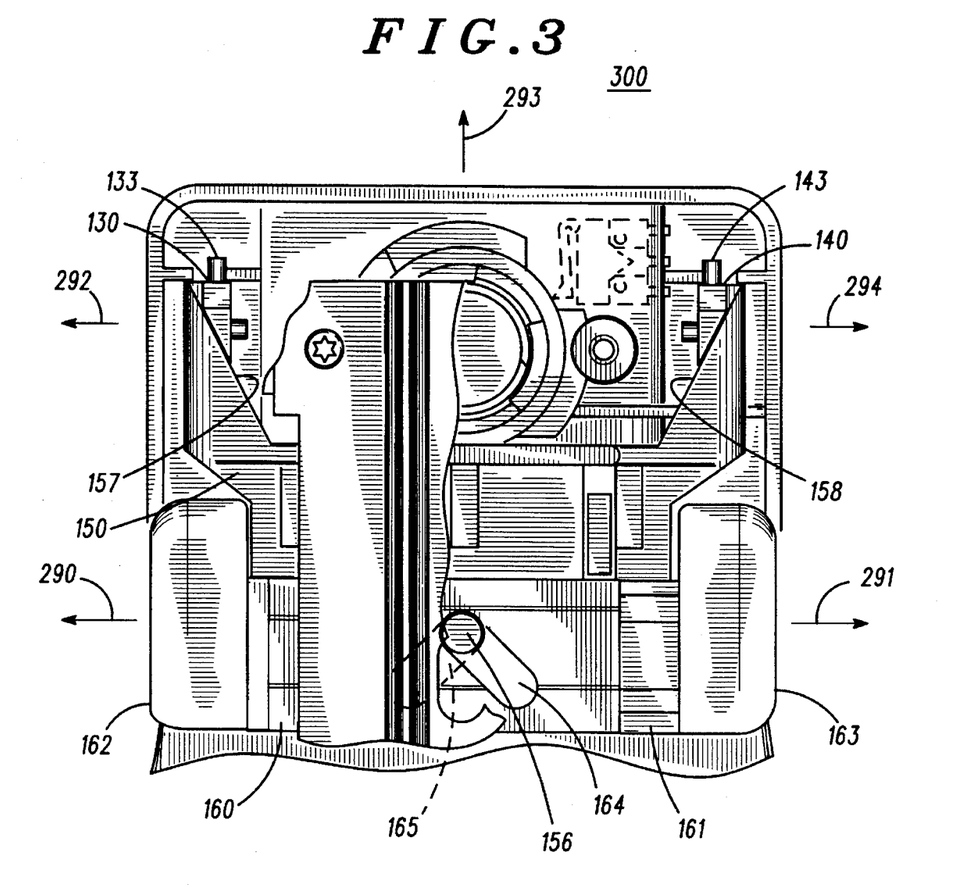
FIG. 3 illustrates a partial underside view of the front housing portion of the telephone mounting receptacle with the assembled latch mechanism in a release position according to the present invention.

FIG. 3 illustrates a partial underside view of the front housing portion 101 of the telephone mounting receptacle 100 with the assembled latch mechanism in the release position 300 according to the present invention. A portion of the retention panel 180 has been cutaway to better illustrate the interrelationship between the longitudinally extending plate members 160 and 161, the intermediate actuator element 150, the right retractable latch member 130, and the left retractable latch member 140. With the latch mechanism in the release position 300, the right retractable latch member 130 and the left retractable latch member 140 are in position to release the telephone from the telephone mounting receptacle 100.

When no actuation force is applied to any of the force receiving surfaces 162 and 163, the elastic spring force exerted by the joints of the right rigidly elastic latch flange 181 and the left rigidly elastic latch flange 182 of the retention panel 180 causes a reverse translation. The rear portions of both the right retractable latch member 130 and left retractable latch member 140 that are coupled to the respective right rigidly elastic latch flange 181 and left rigidly elastic latch flange 182 are forced to pivot about their respective pair of vertical axis tabs 133 and 143 in the directions illustrated by arrows 292 and 294, respectively. This in turn causes the respective short latching surfaces 132 and 142 to simultaneously move in the direction of the arrows 292 and 294, respectively. As the rear portions of the right retractable latch member 130 and the left retractable latch member 140 pivot in the directions illustrated by arrows 292 and 294, respectively, a component force causes the slidably coupled right ramped portion 157 and left ramped portion 158 to move in a direction opposite to that illustrated by the arrow 293. The intermediate actuator element 150 and the projecting tab 156 further cause the plate members 160 and 161 to translate in the direction of the arrows 292 and 294, respectively. This results in the latch position illustrated by FIG. 2.

Figure 4:
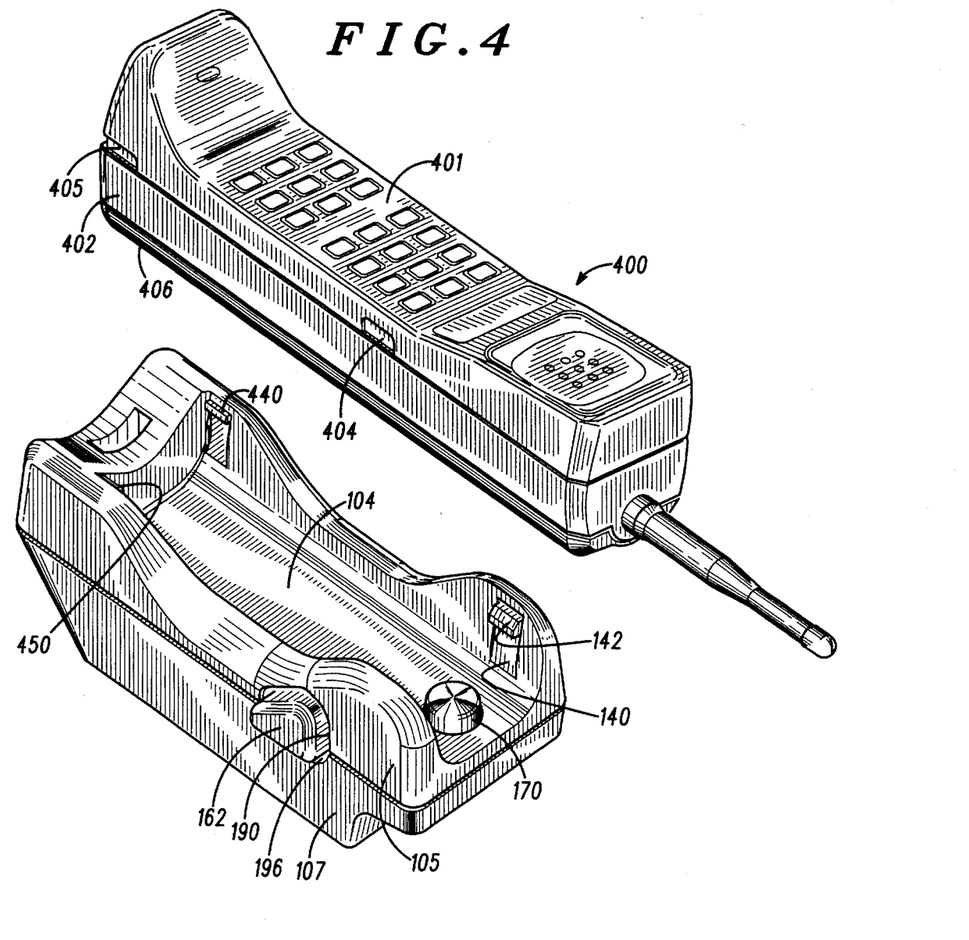
FIG. 4 is a perspective view of the telephone mounting receptacle and associated telephone according to the present invention.

FIG. 4 depicts a perspective view of the telephone mounting receptacle 100 and an associated telephone 400. The telephone 400 has a longitudinal dimension and a transverse dimension orthogonal to the longitudinal dimension, the longitudinal dimension being longer than the transverse dimension. The telephone 400 preferably comprises a longitudinal dimension of approximately 19.5 cm and a transverse dimension of approximately 4.4 cm. The telephone 400 is housed within a housing formed of a top housing portion 401 and a bottom housing portion 402. A battery 406 extends along the entire longitudinal and transverse dimension of the telephone 400 and occupies the bottom surface of the telephone 400.

The short latching surfaces 132 and 142 of the respective right retractable latch member 130 and left retractable latch member 140 extend in a facially opposed manner above the substantially planar recessed area 104. The short latching surfaces 132 and 142 are molded so as to fit corresponding shallow front notches 404 (only a right side notch is shown) formed into both the right and left sides of the top housing portion 401 of telephone 400. The corresponding shallow front notches 404 could also be formed on the bottom housing portion 402. Furthermore, the seam defined by the boundary of the top housing portion 401 and the bottom 402 housing portions could also accommodate the short latching surfaces 132 and 142.

The telephone mounting receptacle 100 also includes a left short toe prong 440 and a right short toe prong 450 capable of additionally securing a portion of the telephone within the substantially planar recessed area 104. The left short toe prong 440 and right short toe prong 450 extend in a facially opposed manner above the substantially planar recessed area 104 and are molded to fit corresponding shallow rear notches 405 (only a right side notch is shown) formed into both the right and left sides of the top housing portion 401. The corresponding shallow rear notches 405 could also be formed on the bottom housing portion 402. Furthermore, the seam defined by the boundary of the top housing portion 401 and the bottom housing portion 402 could also accommodate the left short toe prong 440 and the right short toe prong 450.

A user may engage the telephone 400 into the telephone mounting receptacle 100 in the following manner. The telephone 400 must initially be slightly angled with respect to the substantially planar recessed area 104 so that the shallow rear notches 405 are positioned to engage the corresponding left short toe prong 440 and the right short toe prong 450. The telephone 400 is then positioned so that the bottom face surface of the battery 406 becomes substantially parallel to the substantially planar recessed area 104 causing the shallow rear notches 405 to engage the left short toe prong 440 and right short toe prong 450, causing the cylindrical element 170 to become depressed, and causing the shallow front notches 404 to engage the short latching surfaces 132 and 142 of the respective right retractable latch member 130 and left retractable latch member 140.

While the telephone 400 is being engaged into the telephone mounting receptacle 100, the bottom face surface of the battery 406 exerts a normal force on the face surface of the cylindrical element 170 causing the retraction of the cylindrical element 170 into the substantially planar recessed area 104. Because the cylindrical button 170 is located between the right retractable latch member 130 and the left retractable latch member 140, the upward force exerted by the spring-loaded cylindrical button 170 promotes contact between the short latching surfaces 132 and 142 of the respective right retractable latch member 130 and left retractable latch member 140 and the corresponding shallow front notches 404. This permits adequate latching and retention of the telephone 400 without requiring long latching surfaces and deep corresponding front notches.

Because the telephone mounting receptacle 100 latches the transverse dimension of the telephone 400 substantially close to the center of the longitudinal dimension of the telephone 400, less holding force is required to maintain adequate engagement of the telephone 400. For passenger safety, the United States government encourages a holding force of at least twenty times the force of gravity for a mounting receptacle installed in an automobile. To meet these requirements, previously known receptacles latching the ends of the telephone 400 along the longitudinal axis and away from the center of gravity, must likely employ an excessively forceful latching mechanism difficult for the user to manually engage or disengage. The geometry of the telephone mounting receptacle 100 permits the transversely-oriented short latching surfaces 132 and 142 to be in close proximity to the center of gravity of the telephone 400 so that the required holding force can be accomplished with a less forceful mechanism that is easy to engage or disengage.

The substantially planar recessed area 104 is dimensioned to correspond to the entire transverse dimension of the telephone 400, but only a portion of the longitudinal dimension of the telephone 400. Thus, after engagement of the telephone 400 into the telephone mounting receptacle 100, approximately one-third of the longitudinal dimension of the telephone 400 will extend beyond the substantially planar recessed area 104. This allows the user to enclose the thumb and index finger around the perimeter of the open one-third of the telephone 400 while middle fingers are free to apply a force to the force receiving surface 162 to disengage the telephone 400 from the telephone mounting receptacle 100.

Disengagement of the telephone 400 is accomplished by applying a force to the force receiving surface 162 of the plate member 160 extending through the openings 190 and 196 in the right side portions 105 and 107 of the telephone mounting receptacle 100. This in turn causes simultaneous retraction of the short latching surfaces 132 and 142 of the respective right retractable latch member 130 and left retractable latch member 140 to a release position, which impels the spring-loaded cylindrical element 170 to disengage the bottom face surface of the battery 406 away from the substantially planar recessed area 104. Removal of the previously applied force causes the short latching surfaces 132 and 142 to reposition in the latch position. After disengagement, the bottom face surface of the battery 406 rests on the cylindrical element 170 such that the shallow front notches 304 rest above the short latching surfaces 132 and 142 avoiding unwanted re-engagement of the telephone 400 into the telephone mounting receptacle 100.

In summary, the present invention provides a telephone mounting receptacle for a cellular telephone that is compatible with "hands free" accessories. The mounting receptacle employs opposing retractable latch members that extend through openings in the mounting receptacle and latch the sides of the cellular telephone along the transverse dimension rather than the longitudinal ends of the cellular telephone; thus, allowing for an optimal but less forceful latching mechanism. When the retractable latch members are positioned in a latch position, a portion of the longitudinally extending cellular telephone may be accepted by the mounting receptacle. While accepted, a spring-like element provides an upward force against the bottom surface of the cellular telephone facilitating attachment between the retractable latch members and notches formed in the cellular telephone; this applied spring force allows the notches formed in the cellular telephone to be shallow. The mounting receptacle further comprises an intermediate actuator element coupled between the retractable latch members and two side positioned force receiving surfaces. An application of force to either force receiving surface translates the intermediate actuator member which simultaneously moves the opposing retractable latch members to a release position allowing the spring element to "eject" the cellular telephone from the mounting receptacle and into the hand of the user. Because the mounting receptacle only extends along a portion of the longitudinal length of the cellular telephone, the user is able to assuredly grasp and release the cellular telephone with one hand.

Although the invention has been described and illustrated in the above description and drawings, it is understood that this description is by example only and that numerous changes and modifications can be made by those skilled in the art without departing from the true spirit and scope of the invention.

I claim:

1. A mounting receptacle for a telephone, the telephone having a longitudinal dimension and a transverse dimension orthogonal to the longitudinal dimension, the longitudinal dimension being longer than the transverse dimension, the mounting receptacle comprising:

a mounting receptacle housing for accepting a portion of the telephone;

at least two facially opposed openings extending through said mounting receptacle housing, said at least two facially opposed openings being incident to the transverse dimension of said portion of the telephone;

at least two retractable latch members movably disposed within the mounting receptacle, each of said retractable latch members having a portion extending into a respective one of said facially opposed openings; and a retention panel disposed within the mounting receptacle and coupled behind said at least two retractable latch members for retaining said at least two retractable latch members in said at least two facially opposed openings, said retention panel having at least two opposing integral rigidly elastic flanges, each of said at least two opposing integral rigidly elastic flanges directly contacting a corresponding one of said at least two retractable latch members.

2. A mounting receptacle according to claim 1, further comprising:

a first plate member having a first force receiving surface slidably coupled to at least one of said retractable latch members; and a second plate member having a second force receiving surface slidably coupled to at least another of said retractable latch members.

3. A mounting receptacle according to claim 2, further comprising an intermediate actuator element operatively coupled to said first and second plate member to retract said retractable latch members upon movement of at least one of said first and second plate members.

4. A mounting receptacle according to claim 3, wherein said intermediate actuator element includes at least two upward extending ramped portions in an abutting relationship with said retractable latch members.

5. A mounting receptacle according to claim 4, wherein each of said at least two retractable latch members includes a downward extending rear angled portion that slidably complements a respective one of said upward extending ramped portions.

6. A mounting receptacle according to claim 1, further comprising two slidably coupled plate members further coupled to an intermediate actuator element movably disposed between said mounting receptacle housing and said retention panel, said retention panel being attached to said mounting receptacle housing to retain assembly of said plate members and said actuator element.

7. A mounting receptacle according to claim 1, wherein said at least two opposing integral rigidly elastic latch flanges bias said at least two retractable latch members in a latching position.

8. A mounting receptacle according to claim 1, wherein said mounting receptacle housing includes an opening through which an element extends, said element is located between said at least two retractable latch members and is coupled to the first side of a spring member, said spring member having a second side seated within said telephone mounting receptacle.

9. A mounting receptacle according to claim 8, wherein said portion of the telephone depresses said element, said depressed element exerts an upward force against said portion of the telephone promoting contact between said at least two retractable latch members and said portion of the telephone.

10. A mounting receptacle according to claim 9, further comprising an electromechanical switch operatively coupled to said element.

11. A mounting receptacle according to claim 1, comprising at least one force receiving surface coupled to said at least two retractable latch members such that a force applied to said at least one force receiving surface simultaneously moves said at least two retractable latch members to a release position.

12. A mounting receptacle according to claim 1, wherein said mounting receptacle housing includes at least two opposed fixed toe prongs for additionally securing said portion of the telephone to said mounting receptacle.

13. A mounting receptacle according to claim 1, wherein said mounting receptacle housing has a substantially planar recessed area permitting the seating therein of said portion of the telephone, said substantially planar recessed area extends along the entirety of the transverse dimension of the telephone, but only along a portion of the longitudinal dimension of the telephone.

14. A mounting receptacle according to claim 13, wherein said substantially planar recessed area accommodates approximately two-thirds of said longitudinal dimension of the telephone.

15. A mounting receptacle according to claim 1,
wherein said portion of the telephone has at least two notches molded into opposing sides thereof; and
wherein each of said at least two retractable latch members has a latching surface, said latching surface being capable of engaging a respective one of said at least two notches.

16. A mounting receptacle for a telephone comprising:
a mounting receptacle housing formed of a first and a second sidewall interconnected by a face surface, each of said first and second sidewalls including an opening;
a substantially planar recessed area extending into said face surface for accepting a portion of the telephone, said substantially planar recessed area including an opening and interconnecting substantially orthogonal first and second recessed area sidewalls, said first and second recessed area sidewalls each including an opening and a fixed toe prong projecting outward for engaging said portion of the telephone;
at least two retractable latch members, each of said retractable latch members extending through a corresponding one of said openings in said first and second recessed area sidewalls, said retractable latch members being movable to permit positioning in either a latch position or a release position, such that, when positioned in said latch position; said retractable latch members are operative to engage said portion of the telephone;
a spring-loaded element extending through said opening in said substantially planar recessed area exerting an upward force against a bottom face of the telephone to promote contact between said retractable latch members in said latch position and said portion of the telephone, said spring-loaded element being coupled to the first side of a spring member, said spring member having a second side seated within said mounting receptacle housing;
an electromechanical switch disposed within said mounting receptacle housing and coupled to said spring-loaded element;
a first plate member housed within said mounting receptacle housing and having an end portion forming a force receiving surface and a rail formed to extend along the length of the first plate member, said end portion of the first plate member extending through said opening of said first sidewall;
a second plate member housed within said mounting receptacle housing and having an end portion forming a force receiving surface and a track formed to extend along the length of the second plate member, said end portion of the second plate member extending through said opening of said second sidewall, wherein said track formed along the second plate member and said rail formed along the first plate member are aligned in confronting engagement to permit sliding engagement such that application of an actuation force to the force receiving surfaces of either or both, of said first or second plate members, respectively, causes translation of said first and second plate members;
an intermediate actuator element coupled between said first and second plate members and said retractable latch members whereby translation of said first and second plate members causes positioning of said retractable latch members in said release position so as to permit removal of said portion of the telephone; and
a retention panel being attached to a rear face surface of said mounting receptacle housing retaining assembly of said plate members, said intermediate actuator element, and said retractable latch members, said retention panel further including integral rigidly elastic latch flanges disposed against said retractable latch members to bias said retractable latch members in said latch position.

* * * * *